US012748964B2

(12) United States Patent
Zalevsky et al.

(10) Patent No.: US 12,748,964 B2
(45) Date of Patent: Sep. 29, 2026

(54) OPTICAL NEURON UNIT AND NETWORK OF THE SAME

(71) Applicant: COGNIFIBER LTD., Rosh Ha'Ayin (IL)

(72) Inventors: Zeev Zalevsky, Rosh HaAyin (IL); Eyal Cohen, Gedera (IL)

(73) Assignee: COGNIFIBER LTD., Rosh Ha'ayin (IL)

( * ) Notice: Subject to any disclaimer, the term of this patent is extended or adjusted under 35 U.S.C. 154(b) by 1125 days.

(21) Appl. No.: 17/766,269

(22) PCT Filed: Sep. 30, 2020

(86) PCT No.: PCT/IL2020/051065
§ 371 (c)(1),
(2) Date: Apr. 4, 2022

(87) PCT Pub. No.: WO2021/064727
PCT Pub. Date: Apr. 8, 2021

(65) Prior Publication Data

US 2024/0078419 A1 Mar. 7, 2024

Related U.S. Application Data

(60) Provisional application No. 62/909,299, filed on Oct. 2, 2019.

(51) Int. Cl.
*G06N 3/067* (2006.01)
*G02F 3/00* (2006.01)
*H01S 3/067* (2006.01)

(52) U.S. Cl.
CPC ............... *G06N 3/067* (2013.01); *G02F 3/00* (2013.01); *H01S 3/06716* (2013.01)

(58) Field of Classification Search
None
See application file for complete search history.

(56) References Cited

U.S. PATENT DOCUMENTS 5,129,041 A * 7/1992 Pernick ................ G06N 3/0675 359/107
5,568,574 A 10/1996 Tanguay, Jr. et al.
(Continued)

FOREIGN PATENT DOCUMENTS

JP S60181877 A 9/1985
JP H05210141 A 8/1993
(Continued)

OTHER PUBLICATIONS

International Search Report for corresponding application PCT/IL2020/051065 filed Sep. 30, 2020; Mail date Apr. 8, 2021.
(Continued)

*Primary Examiner* — Robert E. Tallman
(74) *Attorney, Agent, or Firm* — CANTOR COLBURN LLP

(57) ABSTRACT

An artificial neuron network and corresponding neuron units are described and corresponding neuron units. The neuron network comprises a plurality of two or more layers of artificial neuron units. The layers of artificial neuron units are configured for communicating between them via an arrangement of two or more optical waveguide (optical fibers). The arrangement of two or more optical waveguides are configured with predetermined coupling between the two or more waveguides, thereby providing cross communication between neuron units of said two or more layers.

20 Claims, 5 Drawing Sheets

(56) References Cited

U.S. PATENT DOCUMENTS

| | | | | |
|---|---|---|---|---|
| 5,982,962 | A | 11/1999 | Koops et al. | |
| 7,941,019 | B1 * | 5/2011 | Brooks | C03B 37/10<br>385/47 |
| 2003/0063834 | A1 | 4/2003 | Godbout et al. | |
| 2003/0169505 | A1 | 9/2003 | Mendlovic et al. | |
| 2016/0033703 | A1 | 2/2016 | Kim et al. | |
| 2018/0259707 | A1 | 9/2018 | Zalevsky et al. | |
| 2019/0294199 | A1 * | 9/2019 | Carolan | G06E 3/006 |
| 2020/0052183 | A1 * | 2/2020 | Shainline | G06N 3/067 |
| 2023/0409894 | A1 * | 12/2023 | Song | G06N 3/067 |

FOREIGN PATENT DOCUMENTS

| | | | |
|---|---|---|---|
| JP | 2015524087 | A | 8/2015 |
| WO | 2017033197 | A1 | 3/2017 |
| WO | 2019186548 | A1 | 10/2019 |

OTHER PUBLICATIONS

Written Opinion of the International Searching Authority for corresponding application PCT/IL2020/051065 filed Sep. 30, 2020; Mail date Apr. 8, 2021.

* cited by examiner

OPTICAL NEURON UNIT AND NETWORK OF THE SAME

TECHNOLOGICAL FIELD

The present invention relates to optical computation devices, and more specifically, optical computation devices and device configurations suitable for use in optically integrated artificial neuron networks.

BACKGROUND

Optical computing utilizes manipulation on visible or infrared light to perform computation processes rather than electric current in electronic computing. Generally, optical computing enables faster computation rates as compared to electronic systems. This is partly since manipulations on light pulses can occur faster and can allow transmission of higher bandwidth of information. For example, electric current signal propagates at only about 10 percent of the speed of light due to the much larger dielectric constant in the microwave range in respect to the optical regime, exemplifying almost 10-fold improvement in computing rate for optical computing. Optics also consumes less power and is less exposed to cross talk due to neighbor electrical fields since photons unlike electros are not polar and do not carry electrical charge.

Conventional optical processing systems typically utilizes electronic-optical hybrid processing, generally referred to as optoelectronic processing. In these systems optical signals are used for data transmission and for certain processing operations and being converted to electronic signals for certain other processing operations. Such optoelectronic devices may lose about 30% of their energy converting electronic energy into photons and back. Moreover, the conversion of optical to electronic signals and back slows the transmission and processing of data. High research efforts are directed at all-optical computing, which eliminates the need for optical-electrical-optical (OEO) conversions, thus lessening the need for electrical power and increasing processing rate.

Another advantageous aspect in the field of optical computing is the implementation of artificial neural networks (ANNs). Generally neural network systems provide processing that enables solving problems in a way corresponding to operation of a human brain. Artificial neural networks are basically computer systems inspired by the biological neural networks (BNNs) that constitute the brain. These systems “learn” to improve their performance to execute a set of commands to complete a task of interest. More specifically, ANNs evolve their set of relevant characteristics from learning material provided thereto for optimizing processing of relevant input for a selected task. A typical ANN system is based on a set of connected units or nodes called artificial neurons which are an artificial equivalent of the biological neurons that constitute the BNN in a brain. The connections between the nodes, being artificial equivalents of the biological synapses, can transmit a signal from one node to another. The artificial neuron that receives the signal is configured to process it and then transmit a corresponding signal to artificial neuron/s connected thereto. Typically, artificial neurons are arranged in layers. Different layers may perform different kinds of transformations on their inputs and transmit a corresponding output signal. Signals travel from the first (input), to the last (output) layer, possibly after traversing the different layers several times.

In previous work, the inventors of the present invention have developed neural network configuration relaying on light propagation and coupling between multi core and multi-mode optical fibers.

For example, WO 2017/033197 to Zalevsky et al. teaches an integrated optical module. The optical module comprises multi optically coupled channels and enables the use thereof in an Artificial Neural Network (ANN). According to some embodiments the integrated optical module comprises a multi-core optical fiber, wherein the cores are optically coupled.

WO 2019/186548 descries an artificial neuron unit and neural network for processing of input light are described. The artificial neuron unit comprises a modal mixing unit, such as multimode optical fiber, configured for receiving input light and applying selected mixing to light components of two or more modes within the input light and for providing exit light, and a filtering unit configured for applying preselected filter onto said exit light for selecting one or more modes of the exit light thereby providing output light of the artificial neuron unit.

GENERAL DESCRIPTION

As indicated above coupling of light propagating in optical fibers may be used for various processing tasks suitable for use in neural network processing. There is, however, a need in the art for an operating all-optical neuron network configuration capable of handling both data transmission and processing using optical manipulations. Generally, in conventional optical networks, optical elements are relatively limited in handling nonlinear/processing operations. These functions are currently operated by electronic processing, the use of high energy laser units and/or operations on cold atoms. Each of these techniques has its disadvantages.

The present invention provides processing solutions suitable for implementing in optical artificial neuron network. The technique of the present invention is based on the use of multi-mode and multi core optical fibers, as well as using free-space propagation properties of light for enabling design of fully operated all-optical neuron network.

Thus, the present invention provides for an artificial neuron network comprising a plurality of artificial neurons formed of optical waveguides. Previous technologies as indicated above with reference to WO 2017/033197 and WO 2019/186548 describing the use of multi-mode and multi core 1D, 2D and 3D waveguides for providing integrated optical modules and artificial neuron unit. The present technique further extends the building blocks for neuron network architectures, providing controlled couplings, processing operations and training related processes, as described in more detail below.

As described in more detail below, the present technique provides an artificial optical neuron unit and neuron network allowing mixing, gain and selected additional operations to be optically applied onto signal within the neuron unit. Generally, an artificial neuron network is trained for selected tasks by adjusting weights of signal portions transmitted through different neurons as well as selected signal paths through the network. The present technique provides optical arrangements allowing selected gain/pumping applied to spatial and/or temporal signal portions and selected signal portion mixing allowing weight adjustments to the network.

According to one broad aspect, the present invention provides an artificial neuron network comprising a plurality of two or more layers of artificial neuron units, said layers of artificial neuron units being configured for communicating between them via an arrangement of two or more optical waveguide (e.g. optical fibers), said arrangement of two or more optical waveguides are configured with predetermined coupling between the two or more waveguides, thereby providing cross communication between neuron units of said two or more layers.

In this connection, it should be noted that the term waveguide as used herein relates to one-dimensional waveguides, as well as to two-dimensional waveguides and three-dimensional waveguides. In this connection, a one-dimensional waveguide it typically presented as a plane waveguide supporting single transverse mode (e.g. single mode optical fiber of thin multi-mode optical fiber). Two- or three-dimensional waveguides may support additional transverse mode, in one or two transverse axes, and up to a bulk waveguide.

According to some embodiments, at least one of said two or more optical waveguides may be configured with one or more etched patterns thereon, forming one or more grating patterns, thereby selectively enhancing coupling of optical signals between said at least one waveguide and at least one other waveguide positioned in selected proximity to said etched pattern.

According to some embodiments, at least two of said two or more optical waveguides may be configured with a tapered region providing increased coupling between the at least two optical waveguides at said region.

According to some embodiments, the tapered region may further comprise a dedicated interaction region providing free-space interaction between optical signals propagating through the respective at least two optical waveguides associated with the tapered region. The dedicated interaction region may be formed by a ferrule element. The ferrule element may comprise gain medium material enabling external pumping to thereby modulate power of optical signals transmitted in said ferrule element. Additionally or alternatively, the ferrule element may further comprise a light reflecting element at one end thereof, thereby providing backscattered light transmitted through at least one of said at least two optical waveguides associated with said tapered region.

According to some embodiments, the at least two optical waveguides associated with said tapered region may further comprise a circulator unit selectively defining at least one input and at least one output waveguides of said tapered region.

Generally, the artificial neuron network may be configured as a cascaded logic gate. In such configuration the neuron network if formed with topology and arrangement of the neuron units provides a series of logic gate processing actions on a set of inputs to provide a selected output.

According to some embodiments, the artificial neuron network comprises one or more artificial neuron units, wherein at least one of said one or more artificial neuron units comprises a modal mixing unit configured for receiving input light of a first wavelength range and applying selected mixing to light components of two or more spatial modes of said input light, said modal mixing unit comprises a multi-mode optical fiber having at least a portion thereof impregnated with gain medium and comprising predetermined gain medium configured for emitting light at predetermined first wavelength range in response to pumping light of second wavelength range, wherein said modal mixing unit is further configured to selectively pump additional energy to one or more spatial modes of said input light propagating therethrough in response to pumping light of said second wavelength range and one or more selected spatial modes.

According to some embodiments, the artificial neuron network comprises one or more optical processing units, such optical processing unit comprises optical gain unit having input and output facets positioned in optical path between a input multi core optical fiber and output multi core optical fiber; said optical gain unit being exposed to external illumination generating a holographic pattern within said optical gain unit thereby selectively affecting light transmission between said input multi core fiber and output multi core fiber.

According to some embodiments, the artificial neuron network comprises one or more optical processing units, such optical processing unit comprises at least one optical input port for receiving first optical signal, an at least one additional input port for receiving a second additional input signal, the optical processing unit comprises a first optical fiber section, an interaction node and a second optical fiber section, wherein said first and second optical fiber sections are configured of optical fiber having selected properties and length for separating optical signal passing therethrough to wavelength or spatial frequency components, said interacting mode is configured for receiving signal components of said first optical signal from said first optical fiber section interact said signal components with said second additional input signal and direct for generating multiplied signal components, and for coupling said multiplied signal components to said second fiber section for transforming said multiplied signal components and providing output signal indicative of interaction between said first and second input signals.

According to some embodiments, the artificial neuron network comprises one or more processing junctions, the processing junction comprises an input port adapted for receiving first and second input optical signals and an optical spatial mixing arrangement configured for receiving said first and second input optical signals and applying optical processing for providing output data indicative of correlation between said first and second input optical signals.

According to one other broad aspect, the present invention provides an artificial neuron unit comprising a modal mixing unit configured for receiving input light of a first wavelength range and applying selected mixing to light components of two or more spatial modes of said input light, said modal mixing unit comprises a multi-mode optical fiber having at least a portion thereof impregnated with gain medium and comprising predetermined gain medium configured for emitting light at predetermined first wavelength range in response to pumping light of second wavelength range, wherein said modal mixing unit is further configured to selectively pump additional energy to one or more spatial modes of said input light propagating therethrough in response to pumping light of said second wavelength range and one or more selected spatial modes.

According to some embodiments, the artificial neuron unit may further comprise a beam combiner located at input thereof, said beam combiner is positioned to direct input light of said first wavelength range and pumping light of said second wavelength range to be coupled into said multi-mode optical fiber.

According to yet another broad aspect, the present invention provides a processing junction (or artificial neuron unit) for use in artificial neuron network, the processing junction comprises input port adapted for receiving first and second input optical signals and an optical spatial mixing arrangement configured for receiving said first and second input optical signals and applying optical processing for providing output data indicative of correlation between said first and second input optical signals.

According to some embodiments, the first and second input optical signals may be associated with optical signals propagating in corresponding first and second multi-core optical fibers.

According to some embodiments, the optical spatial mixing arrangement may comprise at least one optical reflecting element configured for reflecting light of said first and second input optical signals into a common spatial path to thereby enable optical measurement of spatial correlation between said first and second input optical signals.

According to some embodiments, the processing junction may further comprise a de-coherence unit configured for reducing spatial coherent of said first and second input optical signals upstream of said optical spatial mixing arrangement.

According to some embodiments, the processing junction may be configured for receiving said first and second input optical signals through first and second multicore optical fibers, and said optical spatial mixing arrangement is configured for mixing said first and second input optical signals in free space propagation of light.

According to yet another broad aspect, the present invention provides an optical processing unit (or artificial neuron unit) comprising optical gain unit having input and output facets positioned in optical path between a input multi core optical fiber and output multi core optical fiber; said optical gain unit being exposed to external illumination generating a holographic pattern within said optical gain unit thereby selectively affecting light transmission between said input multi core fiber and output multi core fiber.

According to some embodiments, the holographic pattern within the optical gain unit may be three dimensional.

According to some embodiments, the optical processing unit may further comprising a input optical lens unit and an output optical lens unit positioned respectively in optical path between input multi core optical fiber and input facet of said optical gain unit and between output facet of the optical gain unit and said output multi core optical fiber.

According to some embodiments, the input and output multi core optical fibers may be formed as one-dimensional multi core optical fibers, said input optical lens unit being an astigmatic lens configured for directing input light to form a three-dimensional spatial pattern within said optical gain unit.

According to yet another broad aspect, the present invention provides an optical processing unit comprising at least one optical input port for receiving first optical signal, an at least one additional input port for receiving a second additional input signal, the optical processing unit comprises a first optical fiber section, an interaction node and a second optical fiber section, wherein said first and second optical fiber sections are configured of optical fiber having selected properties and length for separating optical signal passing therethrough to wavelength or spatial frequency components, said interacting mode is configured for receiving signal components of said first optical signal from said first optical fiber section interact said signal components with said second additional input signal and direct for generating multiplied signal components, and for coupling said multiplied signal components to said second fiber section for transforming said multiplied signal components and providing output signal indicative of interaction between said first and second input signals.

According to some embodiments, the first and second fiber sections may comprise graded refractive index fiber sections having refractive index profile and length selected for separating optical signal passing therethrough to spatial frequencies thereof, thereby applying spatial Fourier transform to input signals.

According to some embodiments, the interacting mode may comprise an arrangement of a plurality of optical fiber cores formed of optical fibers carrying gain material and wherein said second additional input signal provides selective pumping to said arrangement of a plurality of optical fiber cores, thereby selectively interacting components of said second additional input signal with spatial components of said first optical signal.

According to some embodiments, the first and second fiber sections may comprise dispersive optical fiber having length selected to apply Fourier transformation to optical signal with respect to wavelength components thereof, said interaction node comprises a temporal modulator configured for receiving data indicative of said second additional input signal and modulating components of said first optical signal accordingly, thereby interacting frequency components of said first and second input signals.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
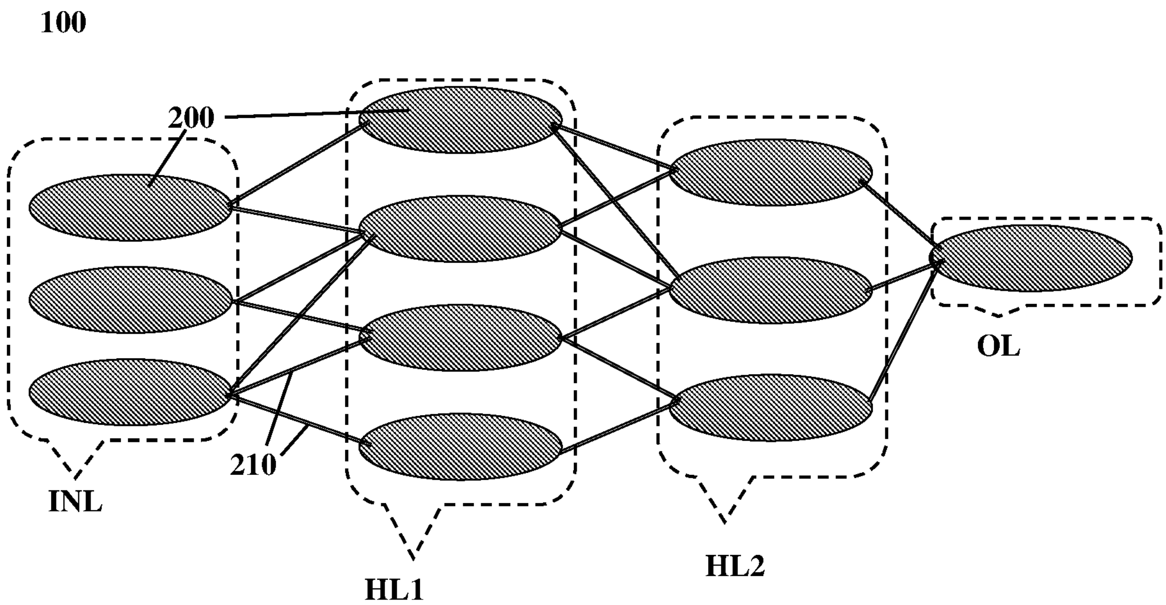
FIG. 1 exemplify general structure of an artificial neuron network.

Artificial Neuron Networks refer to various computing architectures and algorithms inspired by biological neuron networks. Reference is made to FIG. 1 exemplifying a schematic configurations of an artificial neuron network 100 formed by an arrangement of artificial neuron units (neurons) 200 communicating by links 210 between them.

Generally, the neurons 200 are arranged in layers including input layer INL positioned and configured for receiving input data for processing, output layer OL positioned and configured for providing output data after processing. The network may also include one or more intermediate, hidden, layers such as HL1 and HL2 exemplified in FIG. 1. Neurons of the one or more intermediate layers bridge between the input and output layers and take part in the data processing.

As indicated above, optical processing and optical neuron networks may provide enhanced processing speed as compared to electronic processing. Generally, the realization of an optical (photonic) neural network is based on two main operations such as linear mixing between signals associated with two or more artificial neurons (i.e. traveling along two or more optical fibers or fiber cores) and non-linear effects, e.g. associated with amplification and mixing, providing processing within an artificial neuron unit.

The artificial neuron network may be configured and trained for performing various computational operations. Generally, artificial neuron networks such as network 100 may be configured for specific processing applications based on topology of the network, number of layers, arrangement of the layers, and training of the network for the specific applications. For example, the artificial neuron network 100 may be configured to operate as a cascaded logic gate. Such logic gates enable to determine output data based on a plurality of different inputs with selected relations therebetween. Additional exemplary applications may include various data processing that directly be applied on optical inputs. Including for example processing applications such as image recognition and others. It should be noted that the present invention relates to configuration of the optical neural network and artificial neuron unit and may be used for any processing application for which the network and neuron configurations of the present invention are suitable.

According to some embodiments, the present technique provides an artificial optical neuron unit suitable for operating in an artificial optical neuron network. The artificial neuron unit is configured based on one or more optical fibers or waveguides and is configured to provide amplification gain, mixing and/or applying selected operations/transformations onto optical signals. The present technique eliminates, or at lease significantly reduces the need for optical-electronic conversation of the signals, and thus generally obviates the need for optical to electronic signal conversion. The artificial neuron units according to the present technique are generally formed using one or more optical fibers configured and used for at least one of transmitting optical signal portions, coupling optical signal portions between artificial neuron units, and applying one or more processing operations to optical signal portions thereby operating one or more artificial neuron units.

Figure 2:
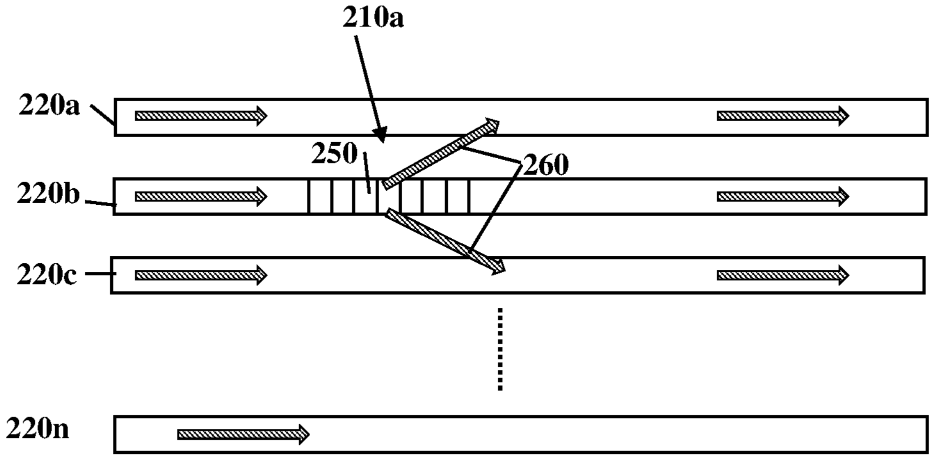
FIG. 2 exemplify coupling optical signal between optical fibers according to some embodiments of the invention.

Reference is made to FIG. 2 exemplifying an optical linking unit 210*a* formed with an arrangement of optical fibers 220*a* to 220*n*. the optical linking unit provides transmission of optical signals to provide input signal to an artificial neuron unit. The optical linking unit 210*a* is formed within one or more selected optical fibers portions at vicinity to one or more other optical fiber portions. In this specific example fiber 220*b* is etched with a periodic pattern 250 forming a grating region (e.g. Bragg grating) of selected period and length (e.g. long period Bragg grating). The periodic pattern 250 is selected to outcouple pre-selected signal portions 260 from the optical fiber 220*b*. The signal portions 260 outcoupled from optical fiber 220*b* may be coupled into neighboring optical fibers, e.g. 220*a* and/or 220*c*, for mixing of signal portions. Additionally or alternatively, signal portions 260 or part thereof may be directed outside of the optical fiber arrangement forming loss of the selected portion of the optical signals. Signal portions 260 may be selected based on wavelength and/or spatial mode by selection of parameters of the periodic pattern 250.

The periodic pattern 250 may be configured as a long period fiber Bragg grating (LPFBG) applied (e.g. etched) on a portion of one or more selected optical fibers 220*b* or on portion of an optical fiber core (in the case of multi-core fiber bundle). The pattern 250 provides controlled coupling between optical fibers with weights for mixing input signal portions selected by pattern 250 parameters. The use of periodic pattern 250 allows controlled coupling between optical fibers while reducing geometrical requirements such as length and physical distance between the neighboring optical fibers.

In some additional configurations, the optical linking unit 210*a* may utilize periodic pattern 260 formed as short period fiber Bragg gratings (SPFBG). The period of the SPFBG is selected in accordance with wavelength of optical signals for separating signal portions based on wavelength of the signal passing through the optical fiber 220*b*. The use of SPFBG along selected optical fiber allows the use of multi spectral optical signals and selective separation of signal portions propagating through the optical fiber based on wavelength thereof. Such periodic pattern 250 may be advantageously used with optical fiber doped with gain material (e.g. Erbium doped optical fiber (EDFA)) used for selective amplification of signal portions as indicated in more detail further below. For example, in such gain doped optical fiber, where a pumping wavelength may be 980 nm and the signals wavelength may be around 1550 nm the use of SPFBG allows for separation between the pumping wavelength and signal wavelength by back reflecting the pumping wavelength while allowing the signal wavelength to propagate with no changes.

In some configurations, core of the one or more optical fibers (220*b*) may be provided with selected active material having non-linear properties. Such active material provides for selectively varying optical effect of the periodic pattern, e.g. by varying refractive index profile along the optical fiber. For example, core of the one or more optical fibers 220*b* may be formed or dopes with photorefractive material (i.e. material exhibiting a photorefractive effect), material having Kerr nonlinearity or liquid crystal material that allow selective variations of the refractive index of the material. The refractive index may vary in response to light interacting by nonlinear interaction in the active material or using external field applied on the fiber 220*b*. For example, the use of such active material allows selective variation of optical properties of the periodic pattern 260 by external illumination or by applying external electric field thereon, and in this case the recording of the LPFBG can be reconfigurable or tunable via external illumination, e.g. by varying refractive index and thus affecting wavelength of the signal as compared to the periodic pattern 250.

As indicated, artificial neuron units 200 may be configured based on multimode optical fiber (MMF). Such multimode optical fiber (MMF) is configured with a first end and a second end and a selected length and diameter and is used for propagating input signals therethrough while mixing spatial modes of the propagating signals. More specifically, light field being input to the MMF may be combination of one or more spatial modes with respect to the MMF structure. Each of the spatial modes propagated through the MMF with respective group velocity, varying modal combination of the output light. Additionally, propagation through the MMF may cause certain mixing between light components shifting optical energy between the modes in accordance with shape and optical properties of the MMF. Thus, the MMF provides exit signal being associated with mixing of modes of the input optical signal.

Figure 3:
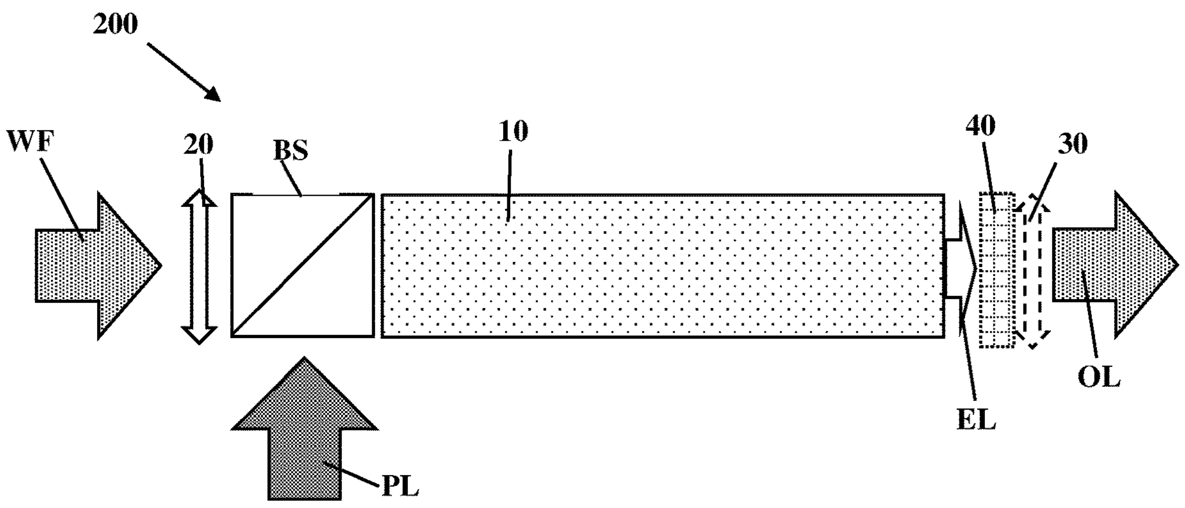
FIG. 3 illustrates an artificial neuron unit capable of nonlinear processing according to some embodiments of the invention.

Further, according to some embodiments, the MMF may be doped with gain material (e.g. erodium doped MMF) selected to provide gain at wavelength range associated with wavelength of optical signals passing therethrough. In this connection FIG. 3 illustrates schematically an artificial neuron unit 200 according to some embodiments of the present invention. The artificial neuron unit 200 is based on a multi-mode fiber (MMF) 10 doped in selected amount of gain medium configured to emit light of a first wavelength range in response to pumping light of a second (pumping) wavelength range. The MMF 10 has a first end for receiving input light and second end for providing output light OL. The MMF 10 may generally be configured as an optical fiber having single wide core supporting a plurality of spatial optical modes of the first wavelength range. The artificial neuron unit 200 may also include a beam splitter unit BS configured for receiving first input light wavefront WF associated with optical signals, and second pumping light PL. The input light wavefront WF may be formed by certain spatial light field. The pumping light PL may have spatial distribution selected to provide pumping energy to one or more selected spatial modes of light within the MMF 10. The artificial neuron unit 200 may also include input optical arrangement 20 configured for coupling light into the MMF 10, output optical arrangement 30. Additionally, the artificial neuron unit 100 may include a spatial light modulator 40 located in optical path of light out coupling from the MMF 10, which may also be associated with a control unit configured for selectively varying pattern of modulation of the spatial light modulator 40. It should be noted that the input and output light of the artificial neuron unit 200 may be from free space propagating light and/or by light propagation between inked optical fibers.

The artificial neuron unit 200 is configured for receiving input light WF signal, typically coupled into the MMF 10 by the input optical arrangement 20, propagating the input light WF through the MMF 10 while mixing spatial modes of the input light signal WF to certain extent and provide exit light EL at the second end thereof. Further, when selected spatial distribution of pumping light PL is input to the MMF 10, the pumping light is used for selectively amplify signal portions associated with spatial modes having high overlap with the spatial distribution of the pumping light PL. The exit light EL may further be selectively modulated by the spatial light modulator 40 in accordance with selected operation/task of the artificial neuron unit, to which the neuron unit is trained, providing output light signal OL. In this connection, it should be noted that generally processing techniques using neural-type configurations are based on one or more networks of neuron units. The networks preferably undergo selected training process in which internal connections, processing parameters are being determined. The artificial neuron unit 100 described herein may be used in various network topologies. For simplicity, the artificial neuron unit 100 may be configured as a single processing unit where selected optical manipulations may be performed by mixing spatial modes of input optical signals WF and amplifying selected spatial modes using the pumping light PL.

The MMF 10 is a multi-mode fiber having selected length (e.g. a few millimeters to a few centimeters, in some embodiments the MMF 10 may be as long as few meters) and diameter (e.g. 30 micrometer or more, 50 micrometer or more) and is typically configured to support propagation of light in selected wavelength range (e.g. 1.5 micrometer) propagating with plurality of spatial modes. The core of the MMF 10 is doped with selected doping ratio by material having gain properties, e.g. providing erodium or other rare earth dopes MMF 10.

Generally, input optical signal having certain wavefront WF, amplitude and length characteristics is transmitted to the artificial neuron unit 100. The input optical signal WF is coupled into the MMF 10 by the input optical arrangement 20 and propagates in the MMF 10 toward the second end thereof. Additionally, pumping light PL of selected spatial waveform (mode) is also coupled into the MMF 10 to provide optical pumping of the gain medium embedded in the MMF 10. While propagating through the MMF 10 modes having high spatial correlation of the pumping light are amplified by stimulated emission of the gain medium. Additionally, the different spatial modes of the optical signal (corresponding to spatial shape of the input light wavefront WF as projected onto structure of the MMF 10) propagate at different velocities and undergo mixing between them. The length of the MMF 10 is selected in accordance with desired mixing between the spatial modes as well as level of amplification provided thereby. Typically, for a relatively short MMF 10, i.e. short with respect to group velocity dispersion properties of the MMF 10, the exit light EL maintains most of the mode content of the input wavefront WF, where selected modes are amplified in accordance with spatial wavefront of the pumping light PL.

The exit light EL may be directed toward the spatial light modulator 40 applying a selected spatial modulation to the wavefront providing output light OL signal. The output light OL signal may then be directed to one or more additional neuron units 200 associated with additional layers of the network, and/or to a corresponding detection unit.

The input optical arrangement 20 may be located in the vicinity of input end of the MMF 10 and configured for coupling input light WF into the MMF 10. In come configurations, the input optical arrangement may be configured to also couple the pumping light into the MMF 10, this may be done by placing the optical arrangement 20 downstream of the beam splitter unit BS with respect to propagation of light into the MMF 10. Alternatively, an additional optical arrangement (not specifically shown) may be used for coupling the pumping light into the MMF 10. Generally, the input optical arrangement 20 may include one or more optical elements such as one or more lenses (e.g. objective lens unit).

As indicated above, in some configurations, the artificial neuron unit 200 may also include an output optical arrangement 30 located downstream of the MMF 10, e.g. between the MMF 10 and spatial light modulator (SLM) 40 and/or downstream of SLM 40 as exemplified in FIG. 3. The output optical arrangement 30 may generally be configured of one or more optical elements such as lenses. The output optical arrangement is typically configured for collecting output light OL from the artificial neuron unit and affect divergence and/or direction of propagation of the output light (e.g. provide collimated output light) in accordance with selected path of output light toward additional neurons, coupling into further optical fibers and/or one or more detection units.

For example, in a typical communication system, the optical signals used are of a first wavelength range around 1550 nm. Additionally, a typical erodium doped optical fiber may respond to pumping light of second wavelength around 980 nm by emitting light around 1550 nm corresponding with the first wavelength range. Thus, proper shaping of pumping light PL spatial distribution can provide selective pumping of one or more selected spatial modes of the optical signal travelling through the MMF 10.

It should be noted that an artificial neuron unit 200 as described herein may further be patterned with one or more periodic patterns selected for coupling out or causing back reflection of residual pumping light to reduce interferences. Such periodic pattern is described herein above with reference to FIG. 2. Alternatively or additionally, the artificial neuron unit 200 or any optical linking unit collecting output light OL may include a spectral filter selected to allow transmission of wavelength of the first wavelength range while filtering out the pumping light of the second wavelength range. The spectral filter may be configured to absorb the pumping light or deflect it to prevent pumping light transmission between layers of the neural network.

Figure 4:
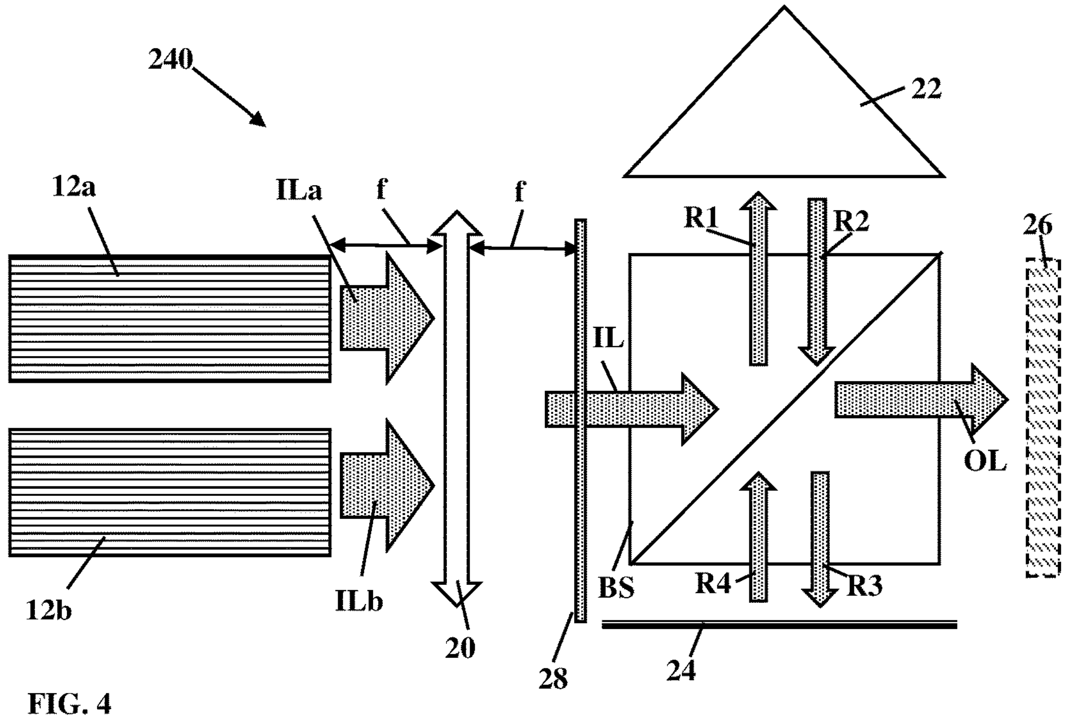
FIG. 4 illustrates an artificial neuron unit configured for determining correlation between input signals according to some embodiments of the invention.

Certain processing operations may be associated with determining correlation between two input signals. For example, such processing steps may be a part of training a neural network. Reference is made to FIG. 4 illustrating an optical processing unit 240 for use in artificial neuron network for determining correlation between two input signals (e.g. processed unlabeled data piece with respect to processed labeled data piece). The optical processing unit 240 may operate as an artificial neuron unit 200 within a neural network, having selected processing operation and configured for receiving first and second input optical signals ILa and ILb, e.g. through corresponding multi-core optical fiber bundles 12*a* and 12*b*. The optical processing unit 240 is configured for spatially folding the first and second optical signals ILa and ILb providing output light OL indicative of spatial interference between the signals. The output signal OL may be detected by optical detector 26 or directed to additional processing in further processing layers.

In the specific example of FIG. 4, the optical processing unit 240 includes a lens unit 20 having selected focal length f and a beam splitter unit BS positioned to receive input light IL after passing through the lens unit 20. Generally, the first part of the correlator optical processing unit 240 has spatially coherent light and a Fourier transform by lens 20. A rotating diffuser 28 may be placed in optical path of the input light to destroy the phase and to convert the spatially coherent light to spatially incoherent signal distribution. As exemplified, the rotating diffuser 28 may be places between the lens unit 20 and beam splitter BS. The second part of the correlator optical processing unit 240 is a cosine transform that is performed using a shearing interferometer formed by beam splitter BS, corner prism 22 and reflecting surface (mirror) 24. The output light OL is in a form of a correlation peak at the spatial correlation between the two input light signals ILa and ILb. The output light OL may be detected by a single pixel detector 26 or transmitted for further use.

The lens unit 20 is preferably positioned to provide Fourier imaging of first and second input light signals ILa and ILb onto a rotating diffuser 28 (i.e. having distance f between output of optical fibers 12*a* and 12*b*). Light distribution IL may become incoherent due to the rotating diffuser 28 and is directed to beam splitter unit BS. The beam splitter unit BS reflects at least a portion R1 of the input light IL toward a corner prism 22 that is positioned to fold the light pattern about an optical axis of the prism 22 directing folded light portion R2. The so-folded light pattern is directed R3 to reflecting surface (mirror) 24 and reflected again R4 toward the beam splitter BS providing output light OL where the first and second portions ILa and ILb of the input light IL are folded onto each other and interfering with each other.

Typically, when the first and second input signals ILa and ILb are matched, the output light OL provides a high correlation peak output. If the input signals are different the output light OL provides low readout. The optical processing unit 200 exemplified in FIG. 4 may be used for example in training process of an optical neuron network for determining correlation between optical signals undergoing processing, while eliminating, or at least significantly reducing the need for conversion of optical signal to electronic data.

Figure 5A:
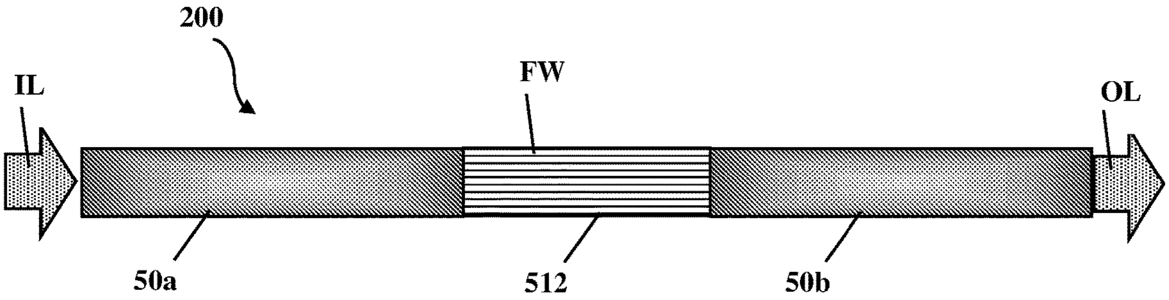
FIGS. 5A and 5B illustrate optical convolution and transformation units according to some embodiments of the invention, FIG. 5A exemplifies spatial convolution unit and FIG. 5B exemplifies 3D spatial and temporal convolution unit.
Figure 5B:
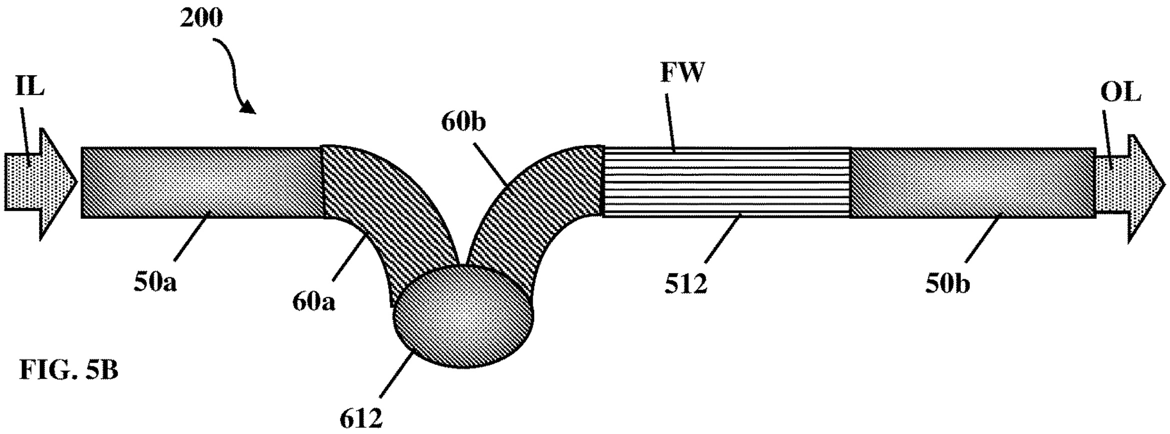

Some processing functions may be associated with determining frequency contents of a signal, or generally determining a Fourier transform of a signal. This may be associated with separate processing of temporal or spatial frequency components of the signal, as well as performing certain operations such as convolution of two signals. To this end the artificial neuron network may utilize one or more artificial neuron units including a selected length of graded index optical fiber (GRIN fiber), having selected refractive index profile and length for affecting light pattern propagating through the optical fiber section to perform one or more selected transformation to the light pattern. For example, the refractive index profile and length may be selected for performing optical Fourier transform to at least one of spatial and temporal dimensions of an optical signal coupled thereto. Performing selected spatial or temporal transformation on input optical signals may be used for additional operations that can be performed directly on optical signals. For example, reference is made to FIGS. 5A and 5B exemplifying optical convolution units 200 performing spatial convolution (FIG. 5A) and spatial and temporal convolution (FIG. 5B). In this example the optical convolution unit 200 utilizes spatial Fourier transform and Erodium doped optical fiber (EDFA) for determining spatial convolution between input optical signal IL and selected weights for spatial frequencies FW provided by selected gain levels (e.g. by selected pumping). Transforming multiplication of signals to convolution of the Fourier transformed signals and vice versa. The optical convolution unit 200 is formed by a multi-mode graded index (GRIN) optical fiber section 50*a* followed by an EDFA network 512 configured for receiving pumping levels with selected radial distribution FW associated with selected weights (e.g. determined by pumping intensities) applied to different spatial frequencies. The EDFA network 512 may be followed with an additional GRIN fiber section 50*b* to provide output light signal OL.

In some examples, the GRIN fiber sections 50*a* and 50*b* may preferably have refractive index profile in the form:

$$n(r) = n_1\sqrt{1-\left(\frac{n_2}{n_1}\right)r^2} \quad \text{(equation 1)}$$

where r is the radial coordinate within the fiber and $n_1$ and $n_2$ are selected refractive index values of the fiber. Using such refractive index profile, the fiber sections 50*a* and 50*b* may be configured to be of length $$L = \frac{\pi}{2}\sqrt{\frac{n_1}{n_2}}.$$

While propagating an optical signal through fiber section 50*a* or 50*b*, the variations in refractive index and phase velocities of signal portions result in two-dimensional spatial Fourier transform of the signal waveform.

Thus, an input signal IL having input waveform structure may be coupled into first GRIN fiber section 50*a*. the input signal propagates through the GRIN fiber section 50*a*, where signal portions propagate at corresponding group velocities, such that at output end of the GRIN fiber 50*a* the intermediate resulting signal is a spatial Fourier is of the input signal. The intermediate resulting signal is coupled into EDFA network 512 such that different spatial frequencies are coupled into different radial sections of the network 512. As indicated above, EDFA network 512 is configured to provide selected radial distribution of gain (e.g. using gradient doping levels or selected pumping distribution) thereby applying a selected gain level to the different Fourier component of the input signal providing multiplied Fourier signal. The multiplied Fourier signal is further coupled into GRIN fiber section 50*b* and propagated therein, while undergoing inverse Fourier transform, to provide output light OL. The output light is in the form of convolution between the input light signal and inverse Fourier transform of the gain distribution in EDFA network 512.

Generally, the EDFA network 512 may include an arrangement of N×N fibers properly connected to output of GRIN fiber section 50*a* and input of GRIN fiber section 50*b* to couple light portions between the fiber sections. N×N points in the output plane of the input GRIN fiber with N×N points in the input plane of the output GRIN fiber. The selected number and arrangement of N×N optical fibers of the EDFA network 512 relate to resolution of the Fourier transform and convolution processing.

Dispersion optical fibers provide varying phase velocity to different wavelength of light passing therethrough. Accordingly, such dispersion optical fiber can apply selected transformation on input optical signal with respect to temporal frequencies thereof. Generally, such dispersion fibers perform temporal Fresnel transform on input optical signal coupled thereto. Sufficiently long dispersion fibers (i.e. optical fiber that is long enough to fulfil far field approximation) affect light signal passing therethrough as Fourier transform in the time domain. FIG. 5B illustrates an optical convolution unit 200 configured for providing temporal convolution as well as spatial convolution of signals. In this connection, the intermediate resulting signal output from GRIN fiber section 50*a* is coupled into a temporal convolution section formed by long dispersion fiber 60*a* (length is not shown to scale), temporal modulator 612 and a second long dispersion fiber 60*b*. the temporal convolution section provides for determining convolution between input (intermediate resulting signal) signal and Fourier of a selected modulation applying by the temporal modulator 612. More specifically, the long dispersion fibers 60*a* and 60*b* affect input signal for providing Fourier transform (or inverse Fourier transform) thereof. The temporal modulator 612 multiplies the temporal frequencies with a selected modulation temporal pattern, which after inverse Fourier transform, provides convolution of the signals. The temporal convolution is between the temporal variations of the input signal and the inverse Fourier of the signal fed to the temporal modulator 612.

It should be noted that such GRIN fiber section, e.g. 50*a*, as well as long dispersion fibers such as 60*a*, may be used for forming additional processing and transformation units in additional to the convolution units exemplified herein. More specifically, using half of the setup of FIG. 5A or 5B. i.e. removing and/or temporal modulators 512 and 612 and replacing them by output end, enables determining spatial and/or temporal Fourier transform of a selected signal. Such transformed signal may be further used for additional processing actions applied to selected frequency components thereof. Further, additional processing elements, e.g. selective modal gain processing 200 as exemplified in FIG. 3, may be used as intermediate components in such transformation and convolution unit 200.

For example, in some configurations, the convolution unit 200 may be configured for generating modulated clock signal output OL. More specifically, an input clock signal may be used for input signal IL where the EDFA network 512 can apply spatial modulation to the clock signal. Additionally, or alternatively, the temporal modulator 612 may be used for applying selected temporal or wavelength modulation for encoding the clock signal in time or in wavelength. Such clock signal may also be further processed obtained using three-dimensional spatial temporal transformation/convolution unit 200. A selected wavelength selective filter may be used to filter out undesired wavelength from temporal Fourier components for applying further processing operation on frequency components of the input signal IL.

Figure 6A:
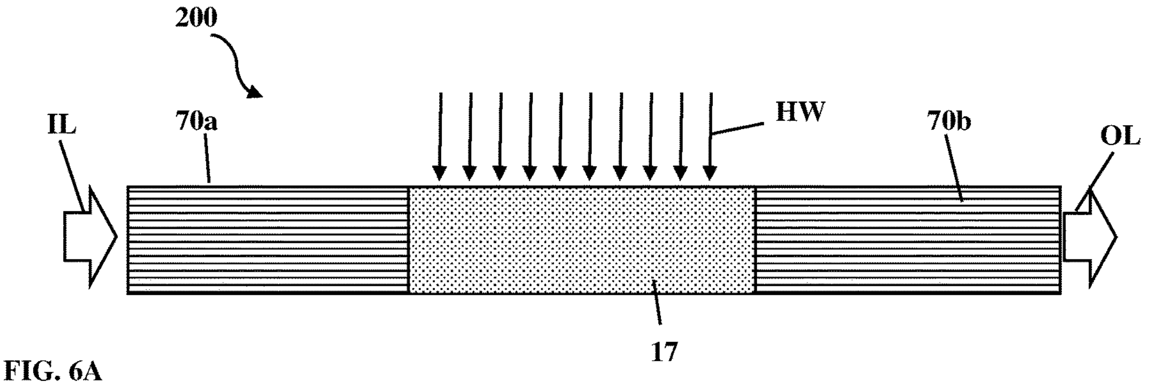
FIGS. 6A to 6C exemplify artificial neuron unit configurations utilizing bilk gain structure according to some embodiments of the present invention, FIG. 6A exemplifies 3D patterning of the bulk gains structure and direct coupling, FIG. 6B exemplifies free space coupling allowing two-dimensional patterning of the bulk gains structure, and FIG. 6C exemplifies the sue of a bulk gain structure and pattern thereof as optical switching unit.
Figure 6B:
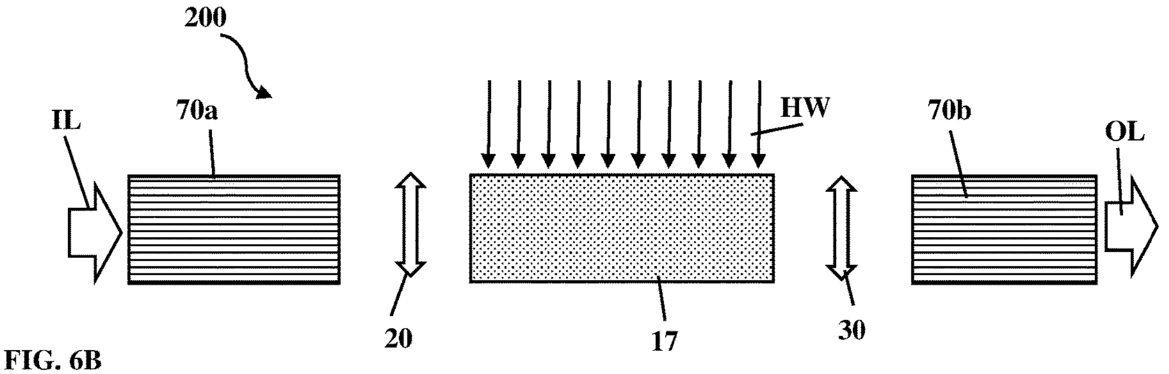
Figure 6C:
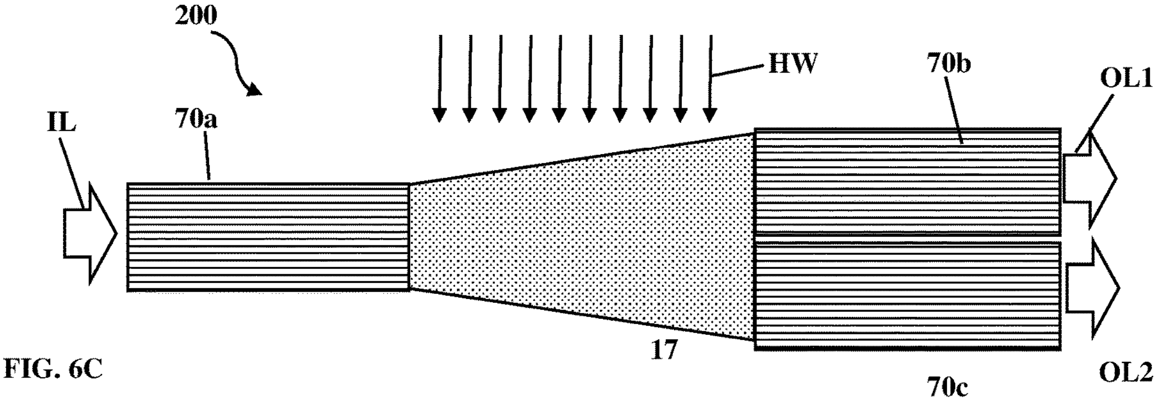

In some additional configurations of the present technique, optical processing unit may include waveguide pattern selectively written/engraved into bulk gain structure. Generally, such selected pumping pattern may be optically applied onto the bulk gain structure to provide selected amplification/light manipulation effects in accordance with the pumping pattern. Such pumping pattern may also provide writing of waveguide pattern within the bulk gain structure enabling selected filtering and phase velocity manipulations on input optical signals. Reference is made to FIGS. 6A to 6C exemplifying artificial neuron unit 200 arrangements utilizing bulk gain structure 17 subjected to selective writing pattern HW (e.g. volume holographic writing) to provide selected waveguide and selected pumping arrangement patterned therethrough. The artificial neuron unit 200 includes input multi-core optical fiber 70*a* and output multi-core optical fiber 70*b* configured for receiving input optical signal IL and directing the input optical signal to be coupled into the bulk gain structure 17 and for receiving light signal exiting the bulk gain structure 17 and directing it to provide output optical signal OL. In the example of FIG. 6A, coupling between the multi-core waveguides 70*a* and 70*b* and the gain structure 17 is direct, i.e. optical fiber to bulk waveguide. In the example of FIG. 6B, optical lenses 20 and 30 are used for coupling light between the multi-core waveguides 70*a* and 70*b* and the gain structure 17. In the Example of FIG. 6C, the bulk structure is selectively operable as a switch allowing to selectively direct input light into multi-core waveguide 70*b* or multi core waveguide 70*c* to provide first or second output light OL1 and OL2 signals The selected writing pattern HW may provide two- or three-dimensional writing of waveguiding channels within the gain structure 17. This may be performed using fast laser systems to provide configurable and controllable architectures, where the waveguiding channels and gain levels thereof may be selectively changed in accordance with optical input for writing HW. As exemplified in FIG. 6C, selective writing may also be used for selective routing of optical signals. More specifically, input signal IL may be directed toward output signal OL1 or OL2 in accordance with the current writing HW pattern on the gain structure 17 and the signal interaction with the so-generating pattern within the gain structure 17.

Generally, the bulk gain structure 17 may be patterned using three-dimensional writing. However, in some configurations the pattern may be two-dimensional, allowing simpler pattern configurations. The example of FIG. 6B allows such configurations where the multi-core fibers 70*a* and/or 70*b* are one-dimensional fiber arrays carrying one-dimensional optical signal the optical lenses 20 and 30 may in this configuration be astigmatic lenses configured for directing the one-dimensional pattern to be relatively wide with respect to the bulk gains structure 17 to avoid divergence of the optical signal.

Figure 7A:
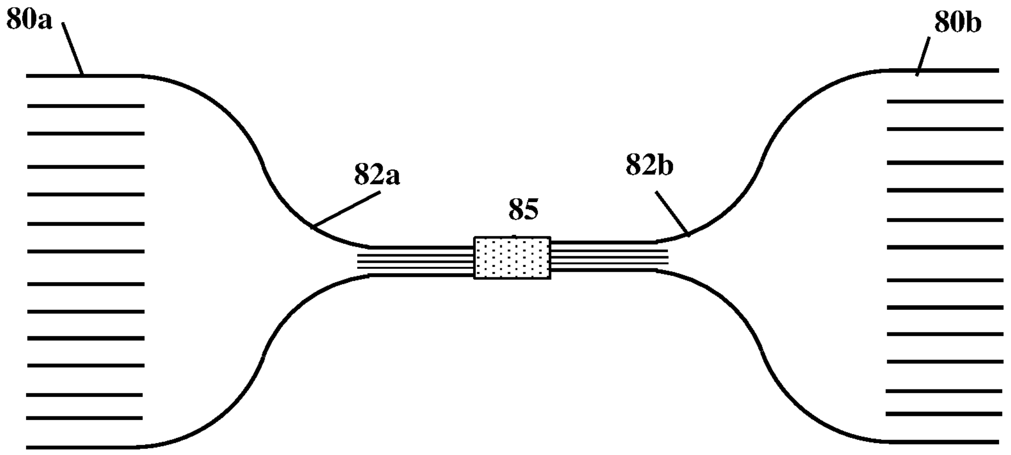
FIGS. 7A and 7B illustrate artificial neuron units utilizing tapered multi-core optical fibered multi core optical fiber for mixing and applying gain to selected signal portions according to some embodiments of the present invention.
Figure 7B:
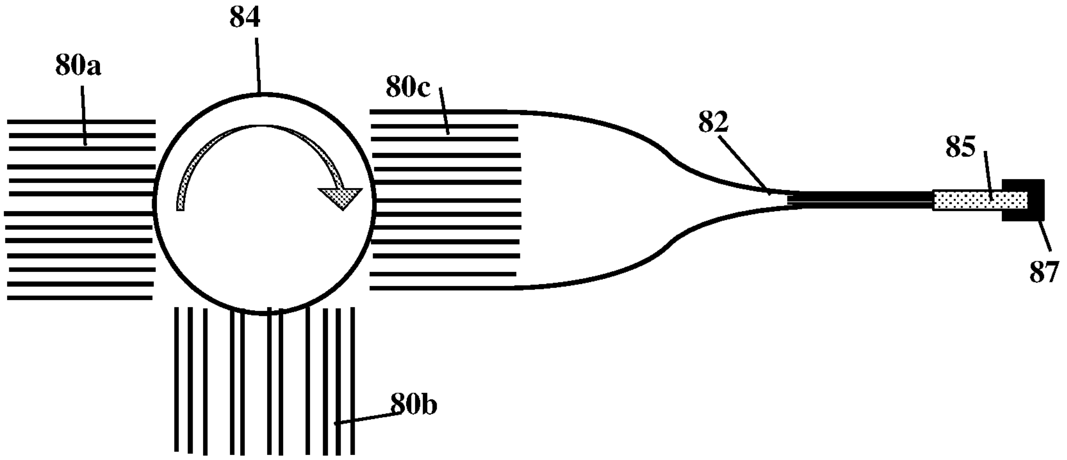

In yet additional exemplary configurations according to the present technique, tapered multi-core fibers may be used to provide direct and proper interaction between optical cores. Reference is made to FIGS. 7A and 7B exemplifying controllable artificial neuron units 200 utilizing tapered multi-core fiber coupling having tapered configuration. Generally, tapered optical fiber configurations enable interactions between optical fibers such that away from the tapered region, the optical fiber cores are distant to prevent interaction, and the tapered region brings the cores together to allow interaction between optical signals transmitted therethrough, e.g. by optical coupling. FIGS. 7A and 7B illustrate artificial neuron units 200 having input and output multi-core optical fibers 80*a* and 80*b* configured with tapered regions 82*a* and 82*b* in FIG. 7A (and 82 in FIG. 7B) to provide coupling of light between the cores of the multi core optical fibers. In the example of FIG. 7A input light signals propagate through input multi-core fiber 80*a* having certain input waveform, as the multi-core fiber is tapered reaching to ferrule 85, the light is allowed to propagate in free space mode through the ferrule 85 and is then coupled into output multi-core fiber 80*b*. this allows coupling and mixing between light components propagating in different cores of the multi core fiber 80*b*. The use of ferrule 85 after the tapered region 82*a*, provides for free space interaction between spatial modes and increased mixing. Additionally, the ferrule may include or be made of non-linear material having selected optical properties such as gain medium, optical Kerr effect etc., selected to allow selective pumping or variation of mixing properties of signal portions. For example, the Ferrule 85 may include Erbium gain medium, or other rare earth materials, to allow external pumping and control of selected weights in the neural network. In some additional configurations, the Erodium optical fibers may be used in the input multi-core fiber 80*a* and/or output multi core fiber 80*b* while the ferrule 85 provides free space mixing between light components, such that the input optical signal is amplified first and then mixed and interacted via the tapered device 82*a* and via the ferrule 85.

In this connection, the example of FIG. 7A illustrates a direct path unit. This is while the example of FIG. 7B utilizes a light reflector 87 at one end of the ferrule 85 to reflect the optical signal, and a circulator 84 located between the input 80*a* and output 80*b* multicore fibers and coupled them in turn to intermediate multi-core fiber section 80*c*.

Accordingly, the present technique provides an artificial optical neuron unit configured for operating in an artificial neuron network. The present technique enables selective weights to input signal portions as well as mixing and operations on optical signals. The present technique enables an all-optical neuron network, or at least almost all-optical, where weight selection, signal processing and even certain training operations may be determined directly based on the optical signals and not requiring conversion to electronic signals.

The invention claimed is:

1. An artificial neuron network comprising a plurality of two or more layers of artificial neuron units, said layers of artificial neuron units being configured for communicating between them via an arrangement of two or more optical waveguides, said arrangement of two or more optical waveguides being configured with predetermined coupling between the two or more waveguides, thereby providing cross communication between neuron units of said two or more layers, wherein said arrangement of two or more optical waveguides is characterized by at least one of the following:

at least one of said two or more optical waveguides is configured with one or more etched patterns thereon, forming one or more grating patterns, thereby selectively enhancing coupling of optical signals between said at least one waveguide and at least one other waveguide positioned in selected proximity to said etched pattern; and at least two of said two or more optical waveguides are configured with a tapered region providing increased coupling between the at least two optical waveguides at said region.

2. The artificial neuron network of claim 1, wherein at least two of said two or more optical waveguides are configured with a tapered region providing increased coupling between the at least two optical waveguides at said region, said tapered region further comprising a dedicated interaction region providing free-space interaction between optical signals propagating through the respective at least two optical waveguides associated with the tapered region.

3. The artificial neuron network of claim 2, wherein said dedicated interaction region is formed by a ferrule element.

4. The artificial neuron network of claim 3, wherein said ferrule element comprises gain medium material enabling external pumping to thereby modulate power of optical signals transmitted in said ferrule element.

5. The artificial neuron network of claim 3, wherein said ferrule element further comprises a light reflecting element at one end thereof, thereby providing backscattered light transmitted through at least one of said at least two optical waveguides associated with said tapered region.

6. The artificial neuron network of claim 5, wherein said at least two optical waveguides associated with said tapered region further comprise a circulator unit selectively defining at least one input and at least one output waveguides of said tapered region.

7. An artificial neuron network, comprising a plurality of two or more layers of one or more artificial neuron units, said layers of the one or more artificial neuron units being configured for communicating between them via an arrangement of two or more optical waveguides, said arrangement of two or more optical waveguides being configured with predetermined coupling between the two or more waveguides, thereby providing cross communication between neuron units of said two or more layers, wherein at least one of said one or more artificial neuron units comprises a modal mixing unit configured for receiving input light of a first wavelength range and applying selected mixing to light components of two or more spatial modes of said input light, said modal mixing unit comprises a multi-mode optical fiber having at least a portion thereof impregnated with gain medium and comprising predetermined gain medium configured for emitting light at predetermined first wavelength range in response to pumping light of second wavelength range, wherein said modal mixing unit is further configured to selectively pump additional energy to one or more spatial modes of said input light propagating therethrough in response to pumping light of said second wavelength range and one or more selected spatial modes.

8. An artificial neuron network, comprising:

a plurality of two or more layers of artificial neuron units, said layers of artificial neuron units being configured for communicating between them via an arrangement of two or more optical waveguides, said arrangement of two or more optical waveguides being configured with predetermined coupling between the two or more waveguides, thereby providing cross communication between neuron units of said two or more layers; and one of the following:

at least one optical processing unit, said optical processing unit comprises optical gain unit having input and output facets positioned in optical path between a input multi core optical fiber and output multi core optical fiber; said optical gain unit being exposed to external illumination generating a holographic pattern within said optical gain unit thereby selectively affecting light transmission between said input multi core fiber and output multi core fiber;

at least one optical processing unit, said optical processing unit comprises at least one optical input port for receiving first optical signal, and at least one additional input port for receiving a second additional input signal, the optical processing unit comprises a first optical fiber section, an interaction node and a second optical fiber section, wherein said first and second optical fiber sections are configured of optical fiber having selected properties and length for separating optical signal passing therethrough to wavelength or spatial frequency components, said interacting mode is configured for receiving signal components of said first optical signal from said first optical fiber section interact said signal components with said second additional input signal and direct for generating multiplied signal components, and for coupling said multiplied signal components to said second fiber section for transforming said multiplied signal components and providing output signal indicative of interaction between said first and second input signals;

at least one processing junction comprising an input port adapted for receiving first and second input optical signals and an optical spatial mixing arrangement configured for receiving said first and second input optical signals and applying optical processing for providing output data indicative of correlation between said first and second input optical signals.

9. The artificial neuron network of claim 1, configured to operate as a cascaded logic gate.

10. An artificial neuron unit comprising:

a modal mixing unit configured for receiving input light of a first wavelength range and applying selected mixing to light components of two or more spatial modes of said input light, said modal mixing unit comprising a multi-mode optical fiber having at least a portion thereof impregnated with gain medium and comprising predetermined gain medium configured for emitting light at predetermined first wavelength range in response to pumping light of second wavelength range, wherein said modal mixing unit is further configured to selectively pump additional energy to one or more spatial modes of said input light propagating therethrough in response to pumping light of said second wavelength range and one or more selected spatial modes; and a beam combiner located at input thereof, said beam combiner is positioned to direct input light of said first wavelength range and pumping light of said second wavelength range to be coupled into said multi-mode optical fiber.

11. A processing junction for use in artificial neuron network, the processing junction comprises input port adapted for receiving first and second input optical signals and an optical spatial mixing arrangement configured for receiving said first and second input optical signals and applying optical processing for providing output data indicative of correlation between said first and second input optical signals.

12. The processing junction of claim 11, wherein said first and second input optical signals are associated with optical signals propagating in corresponding first and second multicore optical fibers.

13. The processing junction of claim 11, wherein said optical spatial mixing arrangement comprises at least one optical reflecting element configured for reflecting light of said first and second input optical signals into a common spatial path to thereby enable optical measurement of spatial correlation between said first and second input optical signals.

14. The processing junction of claim 11, further comprising a de-coherence unit configured for reducing spatial coherent of said first and second input optical signals upstream of said optical spatial mixing arrangement.

15. The processing junction of claim 11, wherein said processing junction is configured for receiving said first and second input optical signals through first and second multicore optical fibers, and said optical spatial mixing arrangement is configured for mixing said first and second input optical signals in free space propagation of light.

16. An optical processing unit having one of the following configurations:

comprising optical gain unit having input and output facets positioned in optical path between a input multi core optical fiber and output multi core optical fiber; said optical gain unit being exposed to external illumination generating a holographic pattern within said optical gain unit thereby selectively affecting light transmission between said input multi core fiber and output multi core fiber; and comprising at least one optical input port for receiving first optical signal, and at least one additional input port for receiving a second additional input signal, the optical processing unit comprises a first optical fiber section, an interaction node and a second optical fiber section, wherein said first and second optical fiber sections are configured of optical fiber having selected properties and length for separating optical signal passing therethrough to wavelength or spatial frequency components, said interacting mode is configured for receiving signal components of said first optical signal from said first optical fiber section interact said signal components with said second additional input signal and direct for generating multiplied signal components, and for coupling said multiplied signal components to said second fiber section for transforming said multiplied signal components and providing output signal indicative of interaction between said first and second input signals.

17. The optical processing unit of claim 16, comprising optical gain unit having input and output facets positioned in optical path between a input multi core optical fiber and output multi core optical fiber; said optical gain unit being exposed to external illumination generating a holographic pattern within said optical gain unit thereby selectively affecting light transmission between said input multi core fiber and output multi core fiber, the optical processing unit being characterized by at least one of the following:

said holographic pattern within the optical gain unit is three dimensional;

further comprises an input optical lens unit and an output optical lens unit positioned respectively in optical path between input multi core optical fiber and input facet of said optical gain unit and between output facet of the optical gain unit and said output multi core optical fiber.

18. The optical processing unit of claim 16, comprising optical gain unit having input and output facets positioned in optical path between a input multi core optical fiber and output multi core optical fiber; said optical gain unit being exposed to external illumination generating a holographic pattern within said optical gain unit thereby selectively affecting light transmission between said input multi core fiber and output multi core fiber; and further comprising an input optical lens unit and an output optical lens unit positioned respectively in optical path between input multi core optical fiber and input facet of said optical gain unit and between output facet of the optical gain unit and said output multi core optical fiber, wherein said input and output multi core optical fibers are formed as one-dimensional multi core optical fibers, said input optical lens unit being an astigmatic lens configured for directing input light to form a three-dimensional spatial pattern within said optical gain unit.

19. The optical processing unit of claim 16, comprising at least one optical input port for receiving first optical signal, an at least one additional input port for receiving a second additional input signal, the optical processing unit comprises a first optical fiber section, an interaction node and a second optical fiber section, wherein said first and second optical fiber sections are configured of optical fiber having selected properties and length for separating optical signal passing therethrough to wavelength or spatial frequency components, said interacting mode is configured for receiving signal components of said first optical signal from said first optical fiber section interact said signal components with said second additional input signal and direct for generating multiplied signal components, and for coupling said multiplied signal components to said second fiber section for transforming said multiplied signal components and providing output signal indicative of interaction between said first and second input signals, characterized by one of the following:

said first and second fiber sections comprise graded refractive index fiber sections having refractive index profile and length selected for separating optical signal passing therethrough to spatial frequencies thereof, thereby applying spatial Fourier transform to input signals; and said first and second fiber sections comprise dispersive optical fiber having length selected to apply Fourier transformation to optical signal with respect to wavelength components thereof, said interaction node comprises a temporal modulator configured for receiving data indicative of said second additional input signal and modulating components of said first optical signal accordingly, thereby interacting frequency components of said first and second input signals.

20. The optical processing unit of claim 16, comprising at least one optical input port for receiving first optical signal, and at least one additional input port for receiving a second additional input signal, the optical processing unit comprises a first optical fiber section, an interaction node and a second optical fiber section, wherein said first and second optical fiber sections are configured of optical fiber having selected properties and length for separating optical signal passing therethrough to wavelength or spatial frequency components, said interacting mode is configured for receiving signal components of said first optical signal from said first optical fiber section interact said signal components with said second additional input signal and direct for generating multiplied signal components, and for coupling said multiplied signal components to said second fiber section for transforming said multiplied signal components and providing output signal indicative of interaction between said first and second input signals, wherein:

said first and second fiber sections comprise graded refractive index fiber sections having refractive index profile and length selected for separating optical signal passing therethrough to spatial frequencies thereof, thereby applying spatial Fourier transform to input signals;

said interacting mode comprises an arrangement of a plurality of optical fiber cores formed of optical fibers carrying gain material and wherein said second additional input signal provides selective pumping to said arrangement of a plurality of optical fiber cores, thereby selectively interacting components of said second additional input signal with spatial components of said first optical signal.

* * * * *